Figure 1:
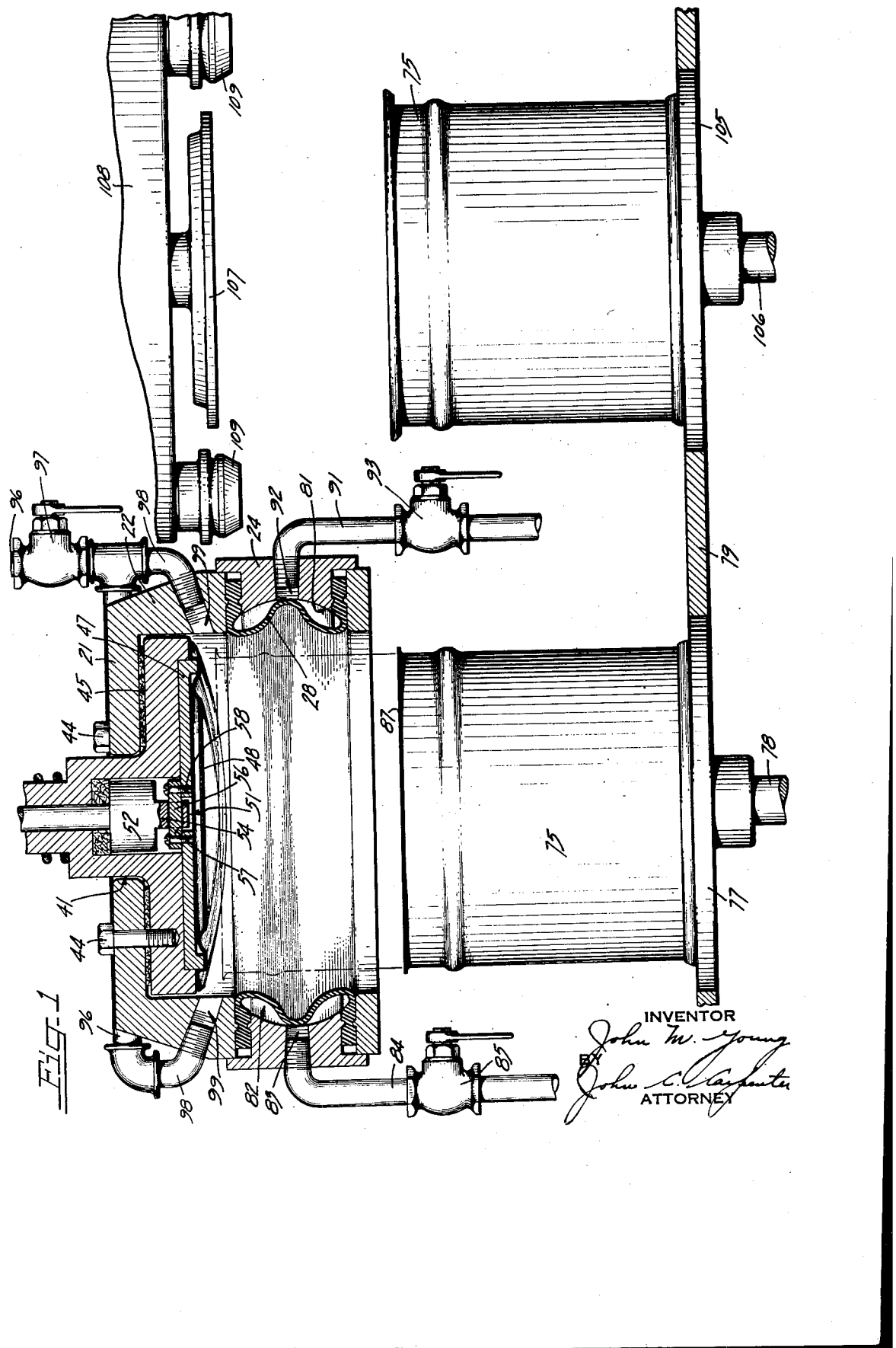

Patented Sept. 15, 1936

2,054,492

UNITED STATES PATENT OFFICE 2,054,492

METHOD OF AND APPARATUS FOR GASSING AND SEALING PRODUCTS IN CANS

John M. Young, Brooklyn, N. Y., assignor to American Can Company, New York, N. Y., a corporation of New Jersey Application July 30, 1932, Serial No. 626,467

18 Claims. (Cl. 226—68)

The present invention relates to a method and apparatus for enclosing an inert gas in a partially filled can, and while it has more particular reference to sweeping out the air in the head space of a can containing shortening material and substituting an inert gas which is confined in the head space by the sealing of the can, it will be apparent that the invention has other valuable applications and uses.

Shortening materials used in cooking and baking may be broadly divided into two main groups, lard which is an animal fat, and vegetable compounds which are usually made from cotton seed oil.

In the manufacture of the compounds the vegetable oils, after preliminary treatments with which the present invention is not concerned, are beaten in the presence of air, to incorporate air throughout the mass. This produces a white, light, fluffy product. An inert gas such as nitrogen has also been beaten into the vegetable oils instead of air for the same purpose. The lard or the vegetable compounds of today are usually packed into cans for distribution to the ultimate consumer and such cans are generally hermetically sealed.

The fats and oils in shortening material products are liable to turn rancid if kept for a period of time and unless stored under low temperatures. Such rancidity is caused by the oxygen in the air chemically combining with the product. Rancidity spoils the marketability of the product and renders it unfit for use.

In the packaging of shortening materials in cans it has been usually the custom to leave a head space above the product and beneath the cover which has been occupied by atmospheric air, of course containing oxygen. This represents a substantial quantity of air with its contained oxygen which is sealed in the can and the oxygen in this air, being in contact with the surface of the product, constitutes the greatest and it is believed the only serious factor in the production of rancidity.

The occluded air which has been beaten into vegetable compounds is distributed as isolated globules and each globule is relatively very small. While the oxygen thus contained in the product chemically reacts with it, there is not sufficient oxygen to carry out this chemical reaction to a point where rancidity can be detected to the taste. Rancidity of the product from this source is therefore negligible.

The present invention is directed to the substitution by simple and effective means of an inert gas, such as nitrogen, for this head space air. The gas is sealed within the can and remains in contact with the upper surface of the shortening material and being inert does not produce any changes in the product. In the substitution process of gas for air, in cans containing vegetable compound, none of the occluded air or gas in the product is disturbed and its fluffy texture and color remain unaltered.

The principal object of the present invention is the provision of a method and apparatus for replacing the air in the head space of a can containing shortening material by a gas which is so introduced as to sweep out the head space and completely fill it with the gas.

The invention also contemplates the subjection of the head space in the can to vacuum so weak in its pulling power and applied for so short a time that any occluded air in the product is undisturbed.

It contemplates further the direction of an inert gas such as nitrogen into the head space of the can and while the vacuum is still active in such manner that the remaining air with its oxygen component is swept from the can and wholly or substantially wholly replaced with the gas so that the final hermetic closure of the can preserves the inert gas atmosphere above the product.

Another important object of the invention is the provision of a process of the character described which may be practiced through the use of simple apparatus and the provision of such apparatus.

An important object of the invention is the provision of an apparatus for performing the method referred to in which a can cover is held in an inclined position relative to a held can containing a shortening material so that inert gas projected into the can eddies and swirls in a sweeping or reverberatory action as the introduced gas fills into the head space and drives out the air.

Another important object of the invention is the provision of an apparatus of the character described which is adapted to enclose the upper open end only of a can and to seal it in position within a chamber which is then vacuumized and in which at the same time an inert gas is introduced which fills the head space in the can.

Numerous other objects of the invention will be apparent as it is better understood from the following description, which, taken in connection with the accompanying drawings, discloses a preferred embodiment thereof.

Figure 2:
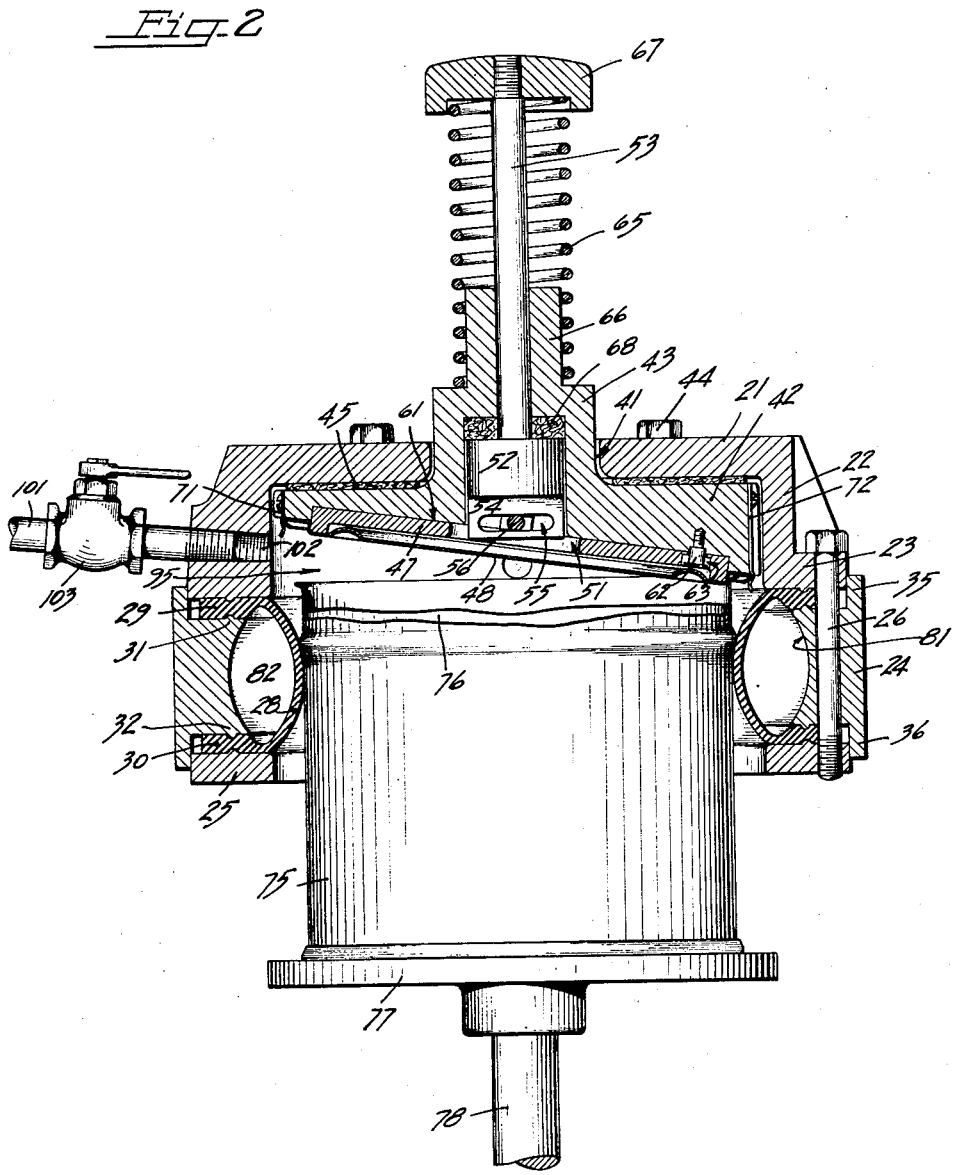

Referring to the drawings:

Figure 1 illustrates, partly in elevation, the principal parts of an apparatus adapted to carry out the steps of the method of the present invention, the gas filling head of the apparatus being shown in section, this figure also showing the relative position of can and cover prior to the introduction of the can into the filling head; and Fig. 2 is a transverse sectional view taken through the filling head of such an apparatus at substantially right angles to the head section in Fig. 1, and illustrates, partly in section, the relative positions of can and cover when fully enclosed and sealed within the filling head chamber and ready for the admission of gas into the head space of the can.

The present invention contemplates the holding of a filled can and its cover in a predetermined position, the can being lifted by a plunger so that its upper end is inserted into a gas filling head and is sealed by a flexible ring which closes off the head chamber. This sealing ring may be of rubber or other suitable material and is adapted to be inflated in order to distend its inner walls which then tightly engage the outside of the can wall and prevent leakage of air between the sealing ring and the can.

A can cover is located in the sealed chamber, being held in an inclined position above the inserted end of the can. Such a cover is positioned in the upper part of the chamber prior to the introduction of the can and is snapped into holding position on a chuck pivotally connected with a sliding rod extending through the upper wall of the filling head.

When so positioned, air is withdrawn from the chamber and from the head space of the can by a relatively low vacuum applied for a short period of time. The desired degree of vacuum, which will be referred to in the present description as "low vacuum", is preferably as high a vacuum as can safely be used with a vegetable compound without extracting the occluded air from the product. This application of vacuum removes a substantial amount of air from the head space of the can.

A few seconds after the product has been subjected to this vacuum an inert gas is projected into the head space and preferably angularly with respect to the top of the product and angularly to the under surface of the inclined cover so that it first strikes the can cover wall, then the opposite can wall and is turned back with reverberating swirling or eddying movements to pick up and carry with it the remaining air.

The vacuum connection is maintained for a short time after the turning in of the inert gas and draws off some of the inert gas with its sweepings of air. As soon as all of the air has been thus swept out the vacuum connection is interrupted and immediately following the supply of inert gas is stopped. The duration of each of these operations is a matter of seconds.

The chuck is then moved by depression of the sliding rod which extends through the filling head. This carries the can cover from its clamped position and inserts it into the upper end of the can. The gas is trapped in the head space, in this manner, the cover frictionally fitting within the can and providing a temporary seal or closure.

The pneumatic sealing ring or tube is thereupon deflated by removal of the air from the inside of the tube and this action releases the can and enlarges the inside ring diameter of the tube by causing its flexible can engaging wall to collapse against the filling head wall. The gassed and closed can is then lowered from the filling chamber with a lowering of the plunger.

The can is moved laterally and brought to rest upon a second plunger disposed beneath sealing instrumentalities illustrated as a part of a suitable double seaming head. The can and cover are then raised into the seaming mechanism and are clamped between the can supporting plunger and the chuck of the seaming head. Cover and can are united or double seamed in the usual manner providing a hermetically sealed package. This permanently confines the trapped gas in the head space of the can and the latter is then ready for distribution and use.

The apparatus illustrated in the drawings for the purpose of illustrating the invention comprises two associated units, a filling head and seaming instrumentalities. The filling head, designated by the numeral 21, embodies an inverted cup shaped casting having a cylindrical side wall 22. This side wall terminates in an annular flange 23.

A collar member 24 provides a detachable intermediate section for the filling head and a washer 25 constitutes the lower section of the head. Parts 24, 25 are secured to the head casting by connecting bolts 26 which pass through the flange 23 and extend through the collar member, having threaded engagement with the washer 25, as illustrated in Fig. 2.

This three piece construction provides not only detachable head parts but also effects a clamp or mounting for a sealing ring member. The sealing ring member is formed of rubber and embodies an annular wall 28 and upper and lower flange walls 29, 30. The upper wall 29 is clamped between the lower surface of the flange 23 and an upper wall surface 31 of the collar member 24.

The surfaces of the flange 23 and wall 31, where they engage the flange 29 of the sealing ring, are preferably beaded to provide a more secure connection for the ring flange. In a similar way flange 30 is clamped between the upper surface of the washer 25 and a wall part 32 formed in the lower end of the collar member 24, the engaged walls of which are also beaded to provide a more effective clamping unit for the ring flange. The ring flanges 29, 30 are tightly squeezed and clamped in this secure position by the bolts 26.

The upper outer edge of the collar member 24 is preferably formed into an annular flange 35 which frictionally engages outside of the outer wall of the head flange 23 and effects a more finished joint. A lower annular flange 36 is formed in the lower outer edge of the collar member 24 for a similar reason, being disposed outside of the outer wall of the washer 25.

The upper wall of the filling head casting is centrally apertured at 41 and a cover block 42 is located inside of the head. A stem section 43 formed centrally of the cover block extends upwardly through the opening 41. This cover block is carried by the upper wall of the filling head, being secured by bolts 44 (Fig. 1).

A sealing washer 45 is interposed between the under surface of the wall of the filling head 21 and the upper surface of the cover block 42 and prevents passage of air between the cover block and the filling head. This seals the interior of the filling head at this place and prevents outside air passing along the aperture 41. The interior of the filling head constitutes a chamber sealed during certain periods of time, as will be more fully explained as the description proceeds.

The cover block 42 carries a chuck 47 on which a can cover 48 is positioned and by which the latter is held during vacuumizing and gassing of the can. Chuck 47 is slotted at 51 so as to provide a clearance for a pivotal connection with a plunger 52 carried on the lower end of a sliding rod 53 extending upwardly through the cover block 42.

The plunger 52 is provided with an extension 54 which projects downwardly into the slot 51 of the chuck. This extension is laterally slotted at 55 for the reception of a pivot pin 56 formed with heads 57 which are secured to the chuck 47 by screws 58. This construction provides a pivotal, loose joint between the plunger 52 and the chuck 47 and permits actuation of the chuck by the movement of the sliding rod 53 and its plunger 52, as will be hereinafter fully described.

The chuck 47 is normally seated in a recess 61 formed in the lower, inclined surface of the cover block 42 and is pivotally connected with the latter at its lower side by a stud 62. This stud is headed as shown and is threadedly secured to the cover block. Its shank and head loosely rest in an opening 63 formed in the chuck, this construction providing a loose pivotal connection for the chuck while retaining its lower edge against displacement from the cover block.

The chuck 47 is normally fully seated within the recess 61 by the action of a spring 65 which surrounds the upper part of the sliding rod 53, its lower end resting upon the stem 43 and encircling a reduced upper end 66 of the stem. The upper end of the spring 65 is confined beneath a button 67 which is threadedly secured to the upper end of the sliding rod 53.

Normal expansion of the spring 65 acting against the button 67 holds the sliding rod 53 in its raised position and this in turn holds up the plunger 52 and the pivot pin 56. A packing 68 is confined within the hollow stem 43 above the plunger 52 and around the rod 53 and prevents passage of air along the rod.

The cover 48 is placed by hand upon the chuck 47, a forward spring clip 71 and a rear clip 72 carried by the cover block 42 providing a yielding snap connection for the cover. The peripheral flange of the cover extends beyond the chuck wall and when the cover is in place, engages the inclined wall of the cover block (Fig. 2).

A can 75 containing a product, in the present instance a shortening material, designated by the numeral 76, is placed upon a plunger 77 which is mounted upon the upper end of a vertical, actuating rod or shaft 78, the upper surface of the plunger 77 being flush with a table 79 associated with the apparatus. This plunger 77 is directly beneath the filling head 21 and is in axial alignment with the vertical center of the head.

The collar member 24 is formed with a concave cylindrical inner wall 81, which with the flexible wall 28 of the sealing ring provides an annular chamber 82 on the inside of the sealing ring. This chamber 82 is in communication with a bore 83 (Fig. 1) in which a pipe 84 of a vacuum line is threadedly secured. A hand valve 85 is disposed in the vacuum line 84 and controls the flow of air therein.

The vacuum line 84 may be connected with any suitable vacuum pump or vacuum tank and when the valve 85 is opened air is withdrawn from the chamber 82. This withdrawal of the air collapses the flexible wall 28 of the sealing ring and causes it to buckle against the cylindrical wall 81, as illustrated in Fig. 1. When the ring is collapsed the can opening into the filling head is at its largest capacity and the filling head is ready for the introduction of the upper end of the can 75.

In inserting the can into proper position within the filling head, the plunger 77 is raised and the can is lifted until its upper flanged edge, designated by the numeral 87, engages with the lowest part of the cover flange, as illustrated in Fig. 2. The vacuum valve 85 is then closed and air under pressure is introduced within the chamber 82 through an air line 91, the upper end of which is threadedly secured in an opening 92 passing through the collar member 24.

This compressed air movement is controlled by a hand valve 93, the air line connecting with any suitable source of air compression, such as a pump or tank. The compressed air, passing into the chamber 82 through the pipe line 91, inflates the sealing ring and moves the flexible wall part 28. This wall tightly engages the cylindrical wall of the upper end of the inserted can, as illustrated in Fig. 2, and seals the chamber (designated by the numeral 95) within the filling head.

With the chamber 95 sealed and can and cover in proper position, the air is partially withdrawn from the chamber through a vacuum line 96 which connects, through a control valve 97, with any suitable vacuum pump or tank. At the machine end the vacuum line 96 branches and terminates in a pair of diametrically opposed pipe elbows 98 which are threadedly engaged within bores 99 extending through the filling head wall 22.

This vacuumizing of the chamber 95 is controlled by the valve 97. The vacuum line 96 is used for low vacuum when a can of vegetable compound is being treated, this degree of low vacuum, as has been already mentioned, not being enough to extract the occluded air in the product within the can. It is sufficient, however, to take away a substantial quantity of air from the interior of the chamber 95 and from the head space within the can and leave only a small amount of air for the sweeping operation that follows.

After this removal of air from the chamber 95 has taken place, an inert gas is introduced into the chamber from a point adjacent the open side of the can and cover. This gas is supplied through a gas line 101 which communicates with any suitable supply of inert gas under desired pressure.

Nitrogen gas has been found desirable for the purpose, it being inert and not absorbed by the product. The pipe line 101 for this gas is threadedly connected with a bore 102, extending through the wall 22 of the filling head. The axis of the bore 102 and the connecting pipe line 101 are at a slight angle to the horizontal, the opening of the bore being positioned above the top part of the can edge.

The gas under pressure entering the partially vacuumized chamber from this pipe line travels rapidly and strikes first against the under surface of the inclined can cover 48, thence against the inner surface of the can wall opposite the bore 102 and then swirls and eddies into the head space of the can above its product producing a reverberatory action which picks up the air remaining in the can space and carries it out of the chamber. The location of the openings communicating with the vacuumizing line assists in this eddying and sweeping action. A hand valve 103 located in the pipe line gives the necessary control of the gas supply.

A complete filling of the head space with pure gas soon takes place, this being a mere matter of seconds. The vacuum valve 97 is now closed and immediately following this the gas valve 103 is closed. The can with its head space filled with gas is now in condition for sealing.

The button 67 is manually depressed and lowering of the rod 53 and pivoting of the chuck 47 follows, the raised forward edge of chuck moving downwardly. This action snaps out and removes the forward edge of the cover flange from its holding clamp 71. Continued downward movement of the sliding rod positively inserts the cover into the upper end of the can. In this position the cover is frictionally held and provides a temporary closure for the can.

The sealing ring is then deflated by removal of the compressed air from the inner ring chamber through the vacuum line 84. This is controlled by operation of the valve 85. The flexible wall 28 moves away from the can and the chamber 95 is then again restored to atmosphere, the air rushing in from the bottom of the filling head and around the can wall.

The can 75 with its cover is returned into lowered position by a return movement of the plunger 77. The can is then slid over the top of the table 79 onto a second plunger 105 (Fig. 1) which is mounted upon a rod 106. Rod 106 is actuated in any suitable manner to raise and lower the plunger and with it the filled and gassed can.

The plunger 105 is in axial alignment beneath a seaming chuck 107 associated with rotating seaming instrumentalities 108 of a suitable form of seaming machine. Such a machine embodies seaming rollers 109 and these rollers, cooperating with the stationary chuck 107 when the can and cover are raised and clamped into the seaming head, spin the flanges of the can and cover and effect a double seamed joint. This permanently seals the can and confines the enclosed gas within its head space. The can, upon removal from the seaming instrumentalities, is then in condition for distribution or other use for which it is intended.

It is thought that the invention and many of its attendant advantages will be understood from the foregoing description, and it will be apparent that various changes may be made in the form, construction, and arrangement of parts of the apparatus mentioned herein and in the steps and their order of accomplishment of the process described herein, without departing from the spirit and scope of the invention or sacrificing all of its material advantages, the apparatus and process hereinbefore described being merely a preferred embodiment thereof.

I claim:

1. The process of sealing an inert gas in a filled can which comprises holding partially open the cover of a filled can, then subjecting the open end of said can to the sweeping action of an inert gas directed in a jet immediately against the lower side of said cover and thence downwardly into the head space of the can so that the head space above the material in the can is cleared of air which is replaced by said gas, and sealing the said can with the enclosed gas confined in said can head space.

2. The process of sealing an inert gas in a filled can which comprises subjecting the open end of a filled can to a sealed chamber, vacuumizing for a relatively short time interval the said chamber and the head space above the material in the can to a low degree which will not induce said material to rise into the head space, introducing a jet of inert gas directly into the head space of said open filled can during said vacuumizing so that the said head space is cleared of air which is replaced by said gas, and sealing the can with the enclosed gas confined in said can head space.

3. The process of sealing an inert gas in the head space of a filled can which comprises inserting the open upper end of a filled can into a chamber holding a cover in tilted position on said can while in said chamber, sealing the chamber, vacuumizing for a relatively short time interval said chamber and the head space of the inserted can to a low degree which will not induce said material to rise into the head space, introducing a steam of inert gas directly against the lower side of said cover and thence downwardly into the head space of said can to clear said can head space of air and replace it with said gas, and then sealing the gas in the said can.

4. The process of sealing an inert gas in the head space of a filled can which comprises positioning a can cover in tilted position within a chamber, inserting the open upper end of a filled can into said chamber in axial alignment with and spaced for a portion of its periphery away from said cover, sealing the chamber, vacuumizing for a relatively short time interval the chamber and the head space of the inserted can to a low degree which will not induce said material to rise into the head space, introducing an inert gas into said chamber in a jet directed against the lower side of said tilted cover and thence downwardly into the head space of said can between said cover and the open end of said can to clear said can head space of air and replace it with said gas, and closing said can with said cover to confine the gas in said head space.

5. The process of sealing an inert gas in the head space of a filled can which comprises positioning a can cover in tilted position within a chamber, inserting the open upper end of a filled can into said chamber in alignment with and in contact for a portion of its periphery with said tilted cover, sealing the chamber, vacuumizing for a relatively short time interval the chamber and the head space of the inserted can to a low degree which will not induce said material to rise into the head space, introducing an inert gas into said chamber in a jet directed immediately against the lower side of said tilted cover and thence downwardly and rearwardly with a swirling action into the head space of said can between said cover and the open end of the can to clear said can head space of air and replace it with said gas, closing said can with said cover to confine the gas in said head space, and uniting said can and cover to permanently seal said gas therein.

6. The process of sealing an inert gas in the head space of a filled can which comprises placing a filled can in an upright position, positioning a can cover above and in alignment with said can and at an angle to its upper edge so as to leave a space between can and cover along one side, introducing an inert gas through said space and in a jet against the lower surface of said inclined cover so as to sweep out the can head space and fill it with said gas, and sealing said can and confining the enclosed gas in said head space.

7. The process of sealing an inert gas in the head space of a filled can which comprises locating a can cover in an inclined position within a chamber, inserting the open upper end of a filled can in upright position into said chamber and beneath said inclined cover, sealing said chamber, vacuumizing for a relatively short time interval said chamber and the head space of said inserted can to a low degree which will not induce said material to rise into the head space, introducing a jet of inert gas under pressure directly against the lower side of said inclined cover and thence downwardly and rearwardly with a swirling movement into the head space of said can during said vacuumizing so as to sweep out said can head space and fill it with gas, and confining said gas in said can head space by moving said cover into closing engagement with said can while still in said sealed chamber.

8. The process of sealing an inert gas in the head space of a filled can which comprises locating a can cover in an inclined position within a chamber, inserting the open upper end of a filled can in upright position into said chamber beneath and in contact with a portion of said inclined cover, sealing said chamber, vacuumizing for a relatively short time interval said chamber and the head space of said inserted can to a low degree which will not induce said material to rise into the head space, introducing a jet of inert gas under pressure directly against the lower side of said inclined cover and thence downwardly into the head space of said can during said vacuumizing so as to sweep out said can head space and fill it with gas, confining said gas in said can head space by moving said cover into closing engagement with said can while still in said sealed chamber, unsealing said chamber, removing said gassed can from said chamber and uniting can and cover to permanently seal said gas therein.

9. The process of sealing an inert gas in a filled can which comprises projecting a stream of inert gas under pressure in a jet against the under surface of a can cover held in an inclined position with its lower edge resting upon the upper open end of a filled can, so that the head space in the can above the can contents is cleared of air which is replaced by said gas, and sealing the can with the enclosed gas confined in said head space by uniting can and cover.

10. The process of sealing an inert gas in a filled can which comprises enclosing the open end of a filled can in a sealed chamber, withdrawing air from said chamber, and projecting a stream of inert gas under pressure against the under surface of a can cover held in an inclined position in said chamber above said enclosed can so that the head space in the can above the contents thereof is substantially cleared of air and is filled with said gas.

11. The process of sealing an inert gas in a filled can which comprises enclosing the upper end of a filled can in a sealed chamber having an outlet, and projecting a stream of inert gas under pressure against the under surface of a can cover held in an inclined position in said chamber above said enclosed can so that air is swept from said can through said outlet, this action clearing the head space in the can above the contents thereof of air and filling it with said gas.

12. The process of sealing an inert gas in a can packed with a material containing occluded air which comprises subjecting for a relatively short time interval an open can with its packed product to a low vacuum insufficient to disturb the occluded air of the product and introducing an inert gas in a stream projected directly against the lower side of a can cover disposed in tilted position on the open end of said can, and thence downwardly with a swirling movement into the head space of said can.

13. The process of sealing an inert gas in a can packed with a material containing occluded air which comprises subjecting a can packed with the material to a low vacuum in degree so proportioned to the time of subjection of said can to said vacuum as to leave said occluded air undisturbed in said product and introducing an inert gas in a stream projected directly against the lower side of a can cover disposed in tilted position on the open end of said can, and thence downwardly with a swirling movement into the head space of said can.

14. An apparatus for filling an inert gas in a can which comprises in combination, a vacuum chamber, means within said chamber for holding a can cover in tilted position, means for inserting the open end of a can into said chamber and in contact with the lower portion only of said tilted cover, means for sealing said chamber, means for vacuumizing said chamber to remove air from the head space in said can above its contents, means for introducing an inert gas directly into the head space of said open can during said vacuumizing so as to sweep out said head space and fill it with said inert gas, and actuating devices for moving said held cover into can closing position to trap said inert gas in said can head space.

15. An apparatus for filling an inert gas in a can which comprises in combination, a chamber, means for inserting the open end of a can into said chamber, means for sealing said chamber, devices for holding a can cover above and in angular position relative to said can to provide a space therebetween, means for introducing a jet of inert gas directly into said can into the space between said can and cover to sweep out the head space in the can above its product and fill it with said inert gas, and actuating devices for moving said held cover into can closing position to trap said inert gas in said can head space.

16. An apparatus for filling an inert gas in a can which comprises in combination, a chamber, means for inserting the open end of a can into said chamber, means for sealing said chamber, devices for holding a can cover above and in angular position relative to said can to provide a space therebetween, means for introducing a jet of inert gas directly into the space between said can and cover to sweep out the head space in the can above its product and fill it with said inert gas, actuating devices for moving said held cover into can closing position to trap said inert gas in said can head space, and seaming instrumentalities associated with said chamber for uniting said can and cover to permanently seal the gas in said can.

17. An apparatus for filling an inert gas in a can comprising in combination, a vacuum chamber, a pivoted can cover holder in said chamber for holding a cover in an inclined position, means for inserting the open end of a filled can into said chamber, a sealing ring connected with said chamber and adapted to engage the exterior walls of said can to seal said chamber, means for vacuumizing said chamber to remove air from the head space in the can above its contents, means for introducing an inert gas into said chamber during said vacuumizing by projecting it under pressure against the under surface of said held cover so as to sweep out said head space and fill it with said inert gas, and actuating devices for moving said can holder to rock it on its pivot and to carry said held cover into the open end of the can to trap the confined gas in said head space.

18. An apparatus for filling an inert gas in a can comprising in combination: a vacuum chamber, vertically reciprocable means for lifting the can and inserting the open end thereof into said chamber, a sealing ring embodying a pneumatic tube connected with said chamber, means communicating with a source of air under pressure to permit inflation of said tube and thereby seal said chamber, means for vacuumizing said chamber to remove air from the head space in the can above its contents, and means for introducing a jet of inert gas downwardly and at an angle directly into the head space of said open can to clear said head space of air and replace the same with said inert gas.

JOHN M. YOUNG.